US008321117B2

(12) United States Patent
Sonoda et al.

(10) Patent No.: US 8,321,117 B2
(45) Date of Patent: Nov. 27, 2012

(54) VEHICLE CONTROL SYSTEM

(75) Inventors: Hiroki Sonoda, Atsugi (JP); Toshiya Oosawa, Yokohama (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 267 days.

(21) Appl. No.: 12/879,217

(22) Filed: Sep. 10, 2010

(65) Prior Publication Data

US 2011/0066350 A1    Mar. 17, 2011

(30) Foreign Application Priority Data

Sep. 17, 2009  (JP) .................................. 2009-215570

(51) Int. Cl.
*B60K 31/00*  (2006.01)
(52) U.S. Cl. ........................................... 701/96; 701/93
(58) Field of Classification Search .................... 701/70, 701/93, 96, 83, 300, 301; 180/178, 179
See application file for complete search history.

(56) References Cited

U.S. PATENT DOCUMENTS

| 8,195,373 B2 * | 6/2012 | Breuer et al. | 701/96 |
| 8,200,409 B2 * | 6/2012 | Sawamoto | 701/96 |
| 8,204,663 B2 * | 6/2012 | Ishida et al. | 701/70 |

FOREIGN PATENT DOCUMENTS

JP    2004-216964    8/2004

* cited by examiner

*Primary Examiner* — Richard M. Camby
(74) *Attorney, Agent, or Firm* — Antonelli, Terry, Stout & Kraus, LLP.

(57) ABSTRACT

A vehicle control system includes: an inter-vehicle distance control section configured to perform a follow-up control to a preceding vehicle by automatically accelerating or decelerating a host vehicle, or a constant speed running control section configured to perform a constant speed running to converge to a set speed; a brake operating state sensing device; and a control unit including; a deceleration control section configured to perform a deceleration in accordance with the brake operating state of the driver when the brake operating state sensing device senses the brake operation of the driver during the inter-vehicle distance control or the constant speed running control; and an acceleration control limit section configured to cancel a control in the acceleration direction which is performed by the inter-vehicle distance control or the constant speed control when the brake operating state sensing device senses an end of the brake operation of the driver.

20 Claims, 11 Drawing Sheets

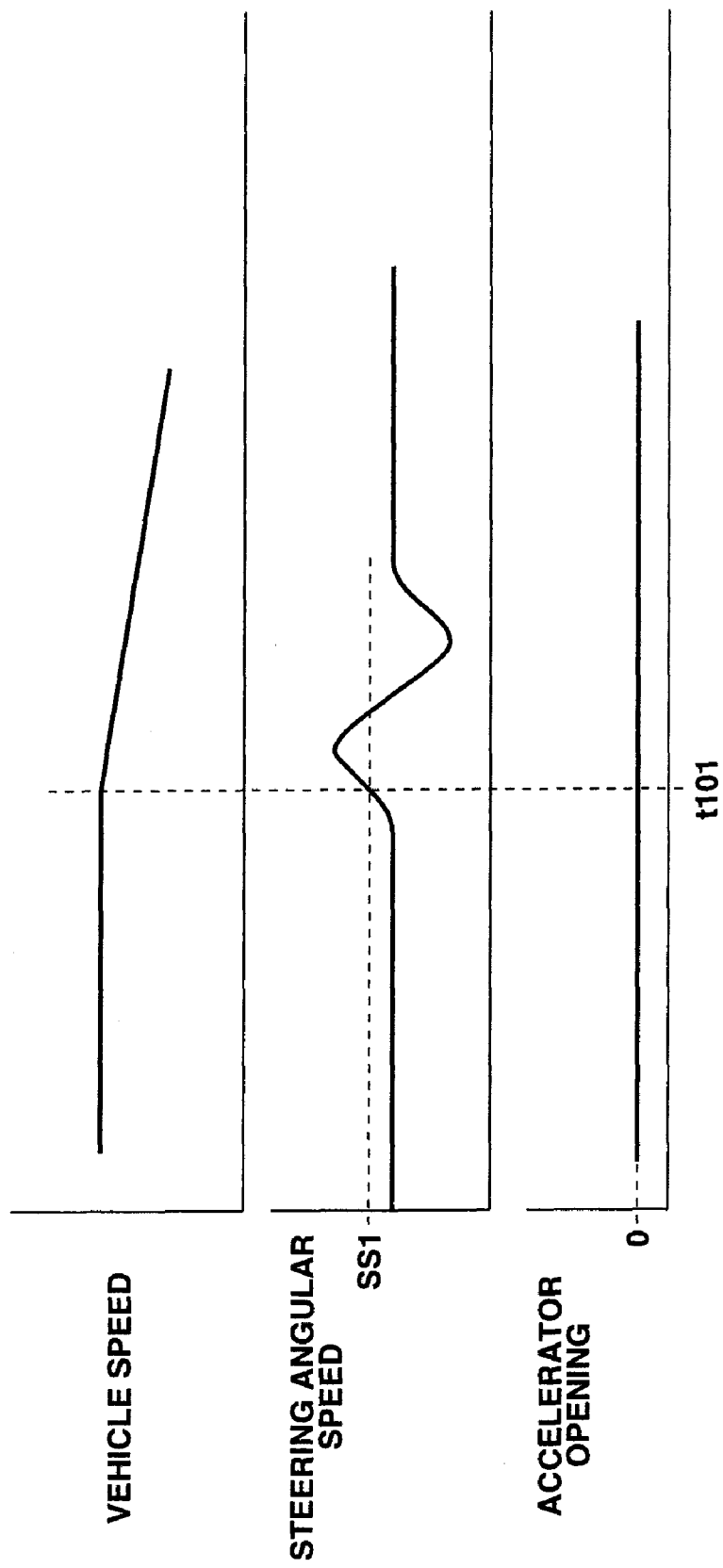

VEHICLE CONTROL SYSTEM

BACKGROUND OF THE INVENTION

This invention relates to a vehicle control system arranged to control a speed of a host vehicle based on running conditions and an operation by a driver.

A Japanese Patent Application Publication No. 2004-216964 discloses a vehicle control system arranged to suspend an inter-vehicle control when a driver operates a brake pedal during the inter-vehicle distance control, and to return to the inter-vehicle distance control when the brake pedal operation is finished. The thus-constructed vehicle control system overcomes an inconvenience of a resetting of the control by a switch and so on.

SUMMARY OF THE INVENTION

However, in the above-described vehicle control system, the control operation is returned to the inter-vehicle distance control operation after the end of the brake operation. Accordingly, the vehicle is accelerated when the preceding vehicle is accelerated, even when the driver wishes to run at a speed after the brake operation. This may cause the unnatural feeling to the driver.

It is, therefore, an object of the present invention to provide a vehicle control system devised to solve the above mentioned problem, and to attain a running state in accordance with a driver's intension.

According to one aspect of the present invention, a vehicle control system comprises: an inter-vehicle distance control section configured to perform a follow-up control to a preceding vehicle by automatically accelerating or decelerating a host vehicle, or a constant speed running control section configured to perform a constant speed running to converge to a set speed; a brake operating state sensing device arranged to sense a brake operating state of a driver; and a control unit including; a deceleration control section configured to perform a deceleration in accordance with the brake operating state of the driver when the brake operating state sensing device senses the brake operation of the driver during the inter-vehicle distance control or the constant speed running control; and an acceleration control limit section configured to cancel a control in the acceleration direction which is performed by the inter-vehicle distance control or the constant speed control when the brake operating state sensing device senses an end of the brake operation of the driver.

According to another aspect of the invention, a vehicle control system comprises: a preceding vehicle sensing device arranged to sense a preceding vehicle; an inter-vehicle distance control section configured to perform a follow-up control to the preceding vehicle by automatically accelerating or decelerating a host vehicle; a brake operating state sensing device arranged to sense a brake operating state of a driver; and a control unit configured to perform a deceleration control in accordance with the brake operation state of the driver when the brake operating state sensing device senses the brake operation of the driver during the inter-vehicle distance control, to perform a coast running when the brake operating state sensing device senses an end of the brake operation, and the preceding vehicle sensing device does not sense the preceding vehicle, and to perform an acceleration limit inter-vehicle distance control to cancel a control in the acceleration direction which is performed by the inter-vehicle distance control when the brake operating state sensing device senses the end of the brake operation, and the preceding vehicle sensing device senses the preceding vehicle.

According to still another aspect of the invention, a vehicle control system comprises: an accelerator operating state sensing device arranged to sense an accelerator operating state of a driver; a brake operating state sensing device arranged to sense a brake operating state of the driver; an inter-vehicle distance control section configured to perform an inter-vehicle distance control to start a follow-up control to hold a predetermined inter-vehicle distance between a host vehicle and a preceding vehicle when the accelerator operating state sensing section senses a decreasing direction of an accelerator operating amount; a deceleration section configured to perform a deceleration control in accordance with the brake operating state of the driver when the brake operating state sensing device senses the brake operation; and an acceleration control limit section configured to cancel a control in the acceleration direction which is performed by the inter-vehicle distance control when the brake operating state sensing section senses an end of the brake operation.

BRIEF DESCRIPTION OF THE DRAWINGS

FIG. 11 is a time chart when a rapid lane change is performed to avoid an obstruction during the constant speed running control according to the fourth embodiment.

DETAILED DESCRIPTION OF THE INVENTION

Figure 1:
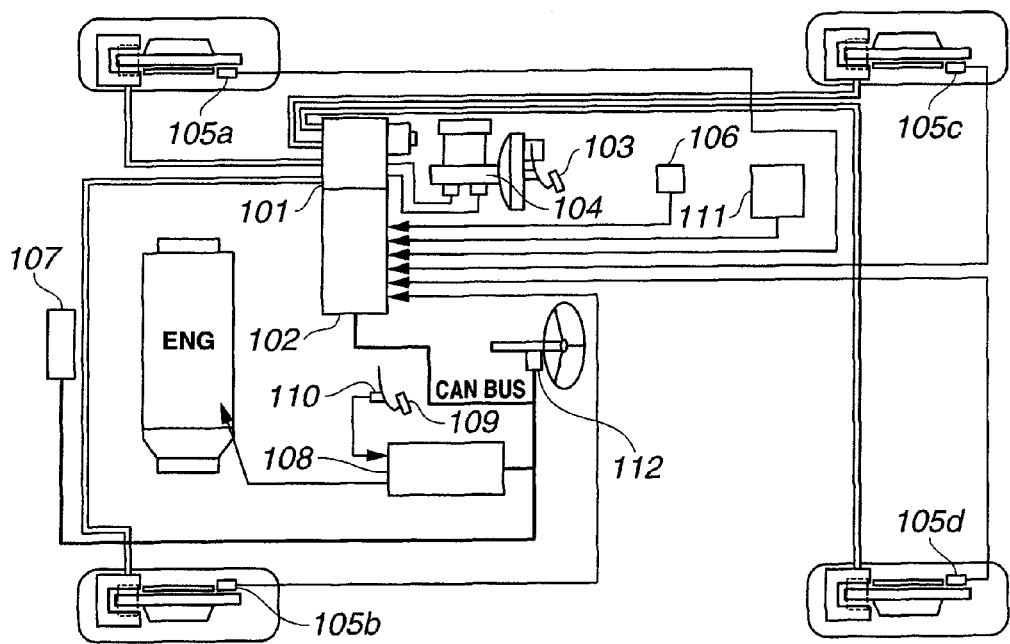
FIG. 1 is an overall system view of a vehicle equipped with a vehicle control system according to a first embodiment of the present invention.

FIG. 1 is an overall system view showing a vehicle equipped with a vehicle control system according to a first embodiment of the present invention. A brake hydraulic unit 101 is configured to control a brake fluid pressure by a command from a brake ECU 102 to generate a braking force on each wheel, and thereby to control a deceleration, a speed and so on of the vehicle. Brake ECU 102 receives a signal from a master cylinder hydraulic pressure sensor 104 arranged to sense a master cylinder hydraulic pressure corresponding to an operating amount (depression amount) of a brake pedal 103 by a driver; signals from wheel speed sensors 105a, 105b, 105c and 105d each arranged to sense a speed of one of wheels; a signal from a vehicle control permission switch 106 arranged to switch a permission and an inhibition of the vehicle control by operating by the driver; a signal from a camera 107 arranged to sense an object, and to sense a distance to the object and a speed of the object; a signal from an engine ECU 108 configured to control a driving condition of an engine ENG; and a signal from a longitudinal acceleration sensor 111 arranged to sense a longitudinal acceleration generated in the vehicle. Engine ECU 108 is configured to sense an accelerator operating amount of the driver from an accelerator opening sensor 110 arranged to sense the accelerator operating amount of the driver, and to generate an engine torque in accordance with the accelerator operating amount. When a target engine torque is outputted from brake ECU 102 through CAN transmission lines, the engine torque is generated in accordance with the target longitudinal acceleration. An accelerator pedal 109 is a pedal which is depressed by the driver to accelerate the vehicle.

The vehicle control system according to the first embodiment does not perform a running control in which an inter-vehicle distance, an inter-vehicle time or a vehicle speed is set by a manual switch operation and so on by the driver. The vehicle control system according to the first embodiment performs a running control in which control conditions (the inter-vehicle distance, the inter-vehicle time, the vehicle speed and so on) are set in response to the operations of the accelerator pedal 109 and the brake pedal 103. Accordingly, after (when) this vehicle control operation is permitted by vehicle control permission switch 106, there is no need for the setting by the special manual operation by the driver.

Figure 2:
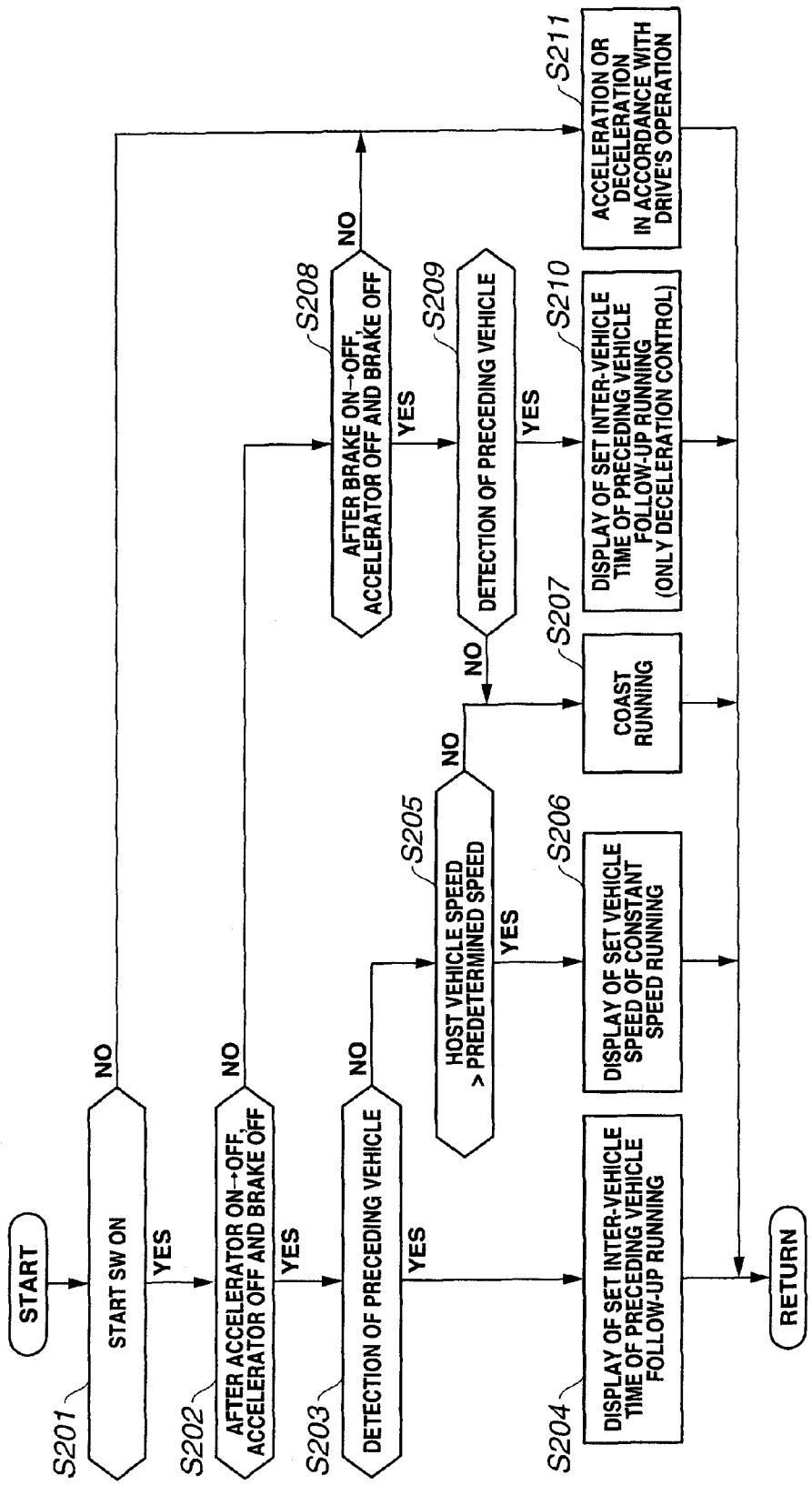
FIG. 2 is a flowchart showing a vehicle control operation performed in the vehicle control system according to the first embodiment of the present invention.

Next, this control operation performed in brake ECU 102 is illustrated. FIG. 2 is a flowchart showing the vehicle control operation according to the first embodiment. At step S201, brake ECU 102 senses ON/OFF signal of vehicle control permission switch 106. When brake ECU 102 senses the ON signal, the process proceeds to step S202. When brake ECU 102 senses the OFF signal, the process proceeds to step S211.

At step S202, brake ECU 102 judges whether or not the accelerator is in the OFF state and the brake is in the OFF state after the driver switches the accelerator from the ON state to the OFF state. When the answer of step S202 is affirmative (YES) (both of the accelerator and the brake are in the OFF state after the driver switches the accelerator from the ON state to the OFF state), the process proceeds to step S203. When the answer of step S202 is negative (NO), the process proceeds to step S208. The ON/OFF state of the accelerator is sensed by judging whether to exceed a predetermined threshold value set in accelerator opening sensor 110. However, it is optional to provide another accelerator switch and so on.

At step S203, brake ECU 102 judges whether or not camera 107 senses (acquires) a preceding vehicle ahead of the host vehicle. When the answer of step S203 is affirmative (YES), the process proceeds to step S204. When the answer of step S203 is negative (NO), the process proceeds to step S205.

At step S204, brake ECU 102 performs a follow-up running control to the preceding vehicle. The follow-up running control is a control for following the preceding vehicle to hold a predetermined inter-vehicle distance (inter-vehicle time). In this case, the inter-vehicle distance (inter-vehicle time) is set to a value when the driver switches the accelerator to the OFF state. Moreover, the set inter-vehicle distance (inter-vehicle time) is displayed in the driver's seat so that the driver can see the set inter-vehicle distance (inter-vehicle time). In this case, the inter-vehicle time is a time by which the host vehicle reaches the sensed object (the preceding vehicle). A relative speed becomes smaller as the inter-vehicle time becomes longer. The relative speed becomes larger as the inter-vehicle time becomes shorter. Moreover, when the driver depresses the brake pedal 103, a constant speed running control is continued while the deceleration control is performed in accordance with the brake operating amount. That is, after the driver switches vehicle control permission switch 106 to the ON state, it is possible to arbitrarily vary the control state of the vehicle by the operating amount of brake pedal 103, the operating amount of accelerator pedal 109 and so on. Accordingly, there is no need for the control by using another switches and so on.

At step S205, brake ECU 102 judges whether or not the speed of the host vehicle is equal to or greater than a predetermined speed (for example, 40 km/h). When the answer of step S205 is affirmative (YES), the process proceeds to step S206. When the answer of step S205 is negative (NO), the process proceeds to step S207.

At step S206, brake ECU 102 performs the constant speed running control. In this case, the speed of the host vehicle is set to a value when the driver switches the accelerator to the OFF state, or a value when the preceding vehicle is lost. Moreover, the set vehicle speed is displayed in the driver's seat so that the driver can see the set vehicle speed. In this case, when the driver depresses the brake pedal 103, the constant speed running control is continued while the deceleration control operation is performed in accordance with the brake control amount.

At step S207, the vehicle performs a coast running (engine braking).

At step S208, brake ECU 102 judges whether or not the accelerator is in the OFF state and the brake is in the OFF state after the driver switches the brake from the ON state to the OFF state. When the answer of step S208 is affirmative (YES) (both of the accelerator and the brake are OFF state after the driver switches the brake from the ON state to the OFF state), the process proceeds to step S209. When the answer of step S208 is negative (NO), the process proceeds to step S211. The ON/OFF state of the brake is sensed by judging whether to exceed a predetermined threshold value set in master cylinder hydraulic pressure sensor 104. However, it is optional to provide a brake switch and so on.

At step S209, brake ECU 102 judges whether or not camera 107 senses (acquires) the preceding vehicle. When the answer of step S209 is affirmative (YES), the process proceeds to step S210. When the answer of step S209 is negative (NO), the process proceeds to step S207. At step S207, the vehicle performs the coast running (the engine braking).

At step S210, brake ECU 102 performs the follow-up running control (only the deceleration) to follow-up the preceding vehicle. That is, there is an acceleration control limiting section configured to cancel the requirement of the acceleration even when the acceleration control is required. Moreover, the inter-vehicle distance (the inter-vehicle time) is set to a value when the driver switches the brake to the OFF state. In this case, the only deceleration control is performed. The inter-vehicle distance (inter-vehicle time) may be difficult to become equal to the set value since the acceleration control is not performed. In this case, a value closer to the set value is attained. Moreover, the set inter-vehicle distance (the set inter-vehicle time) is displayed in the driver's seat so that the driver can see the set inter-vehicle distance (the set inter-vehicle time).

At step S211, the accelerator is in the ON state or the brake is in the ON state. Accordingly, the host vehicle is accelerated or decelerated in accordance with the operation of the driver.

Figure 3:
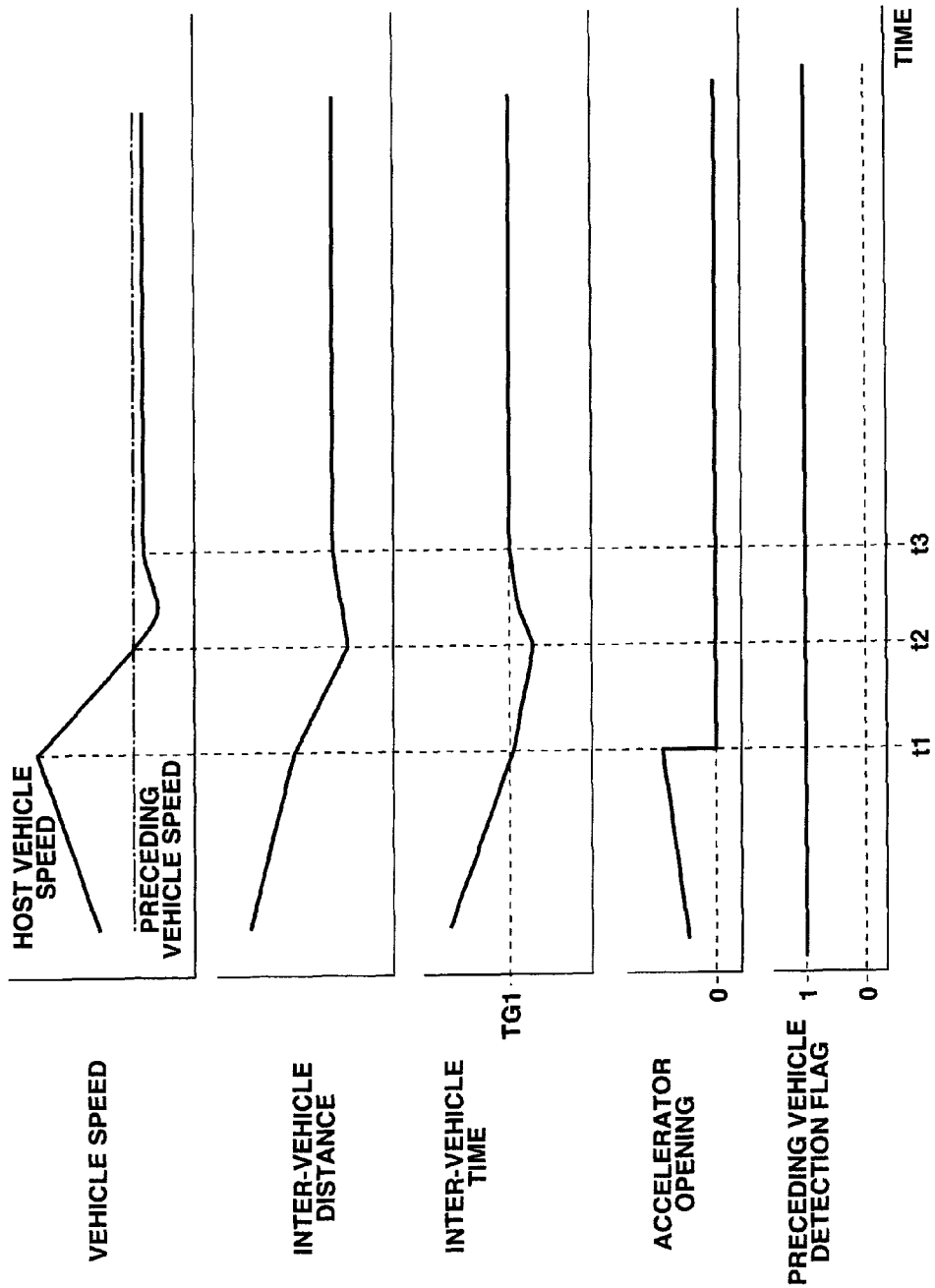
FIG. 3 is a time chart showing a follow-up running control according to the first embodiment of the present invention.

FIG. 3 is a time chart showing the follow-up running control according to the first embodiment. This corresponds to an operation in which the process proceeds by step S202→S203→S204 and S211 of FIG. 2. An initial state is a state in which the accelerator pedal of the host vehicle is in the ON state and the host vehicle is accelerated by the driver's operation when the preceding vehicle runs at the predetermined vehicle speed. At time t1, when the accelerator is switched from the ON state to the OFF state, the process proceeds to step S203. Since the both of the accelerator and the brake are in the OFF state, the preceding vehicle is sensed, and the follow-up control is performed. That is, the inter-vehicle time TG1 at this time is set to the set value. Brake hydraulic unit 101 performs the deceleration control (or the engine brake control by engine ENG) so that the inter-vehicle time between the host vehicle and the preceding vehicle becomes the set time TG1. At time t2, when the vehicle speed of the host vehicle becomes smaller than the vehicle speed of the preceding vehicle, the inter-vehicle distance when the speed of the host vehicle becomes substantially equal to the speed of the preceding vehicle is set to the set inter-vehicle distance, and the inter-vehicle distance control is performed. The acceleration control by engine ENG is performed after the deceleration control by brake hydraulic unit 101. After time t3, the follow-up running control is performed so that the relation between the host vehicle and the preceding vehicle becomes constant.

Figure 4:
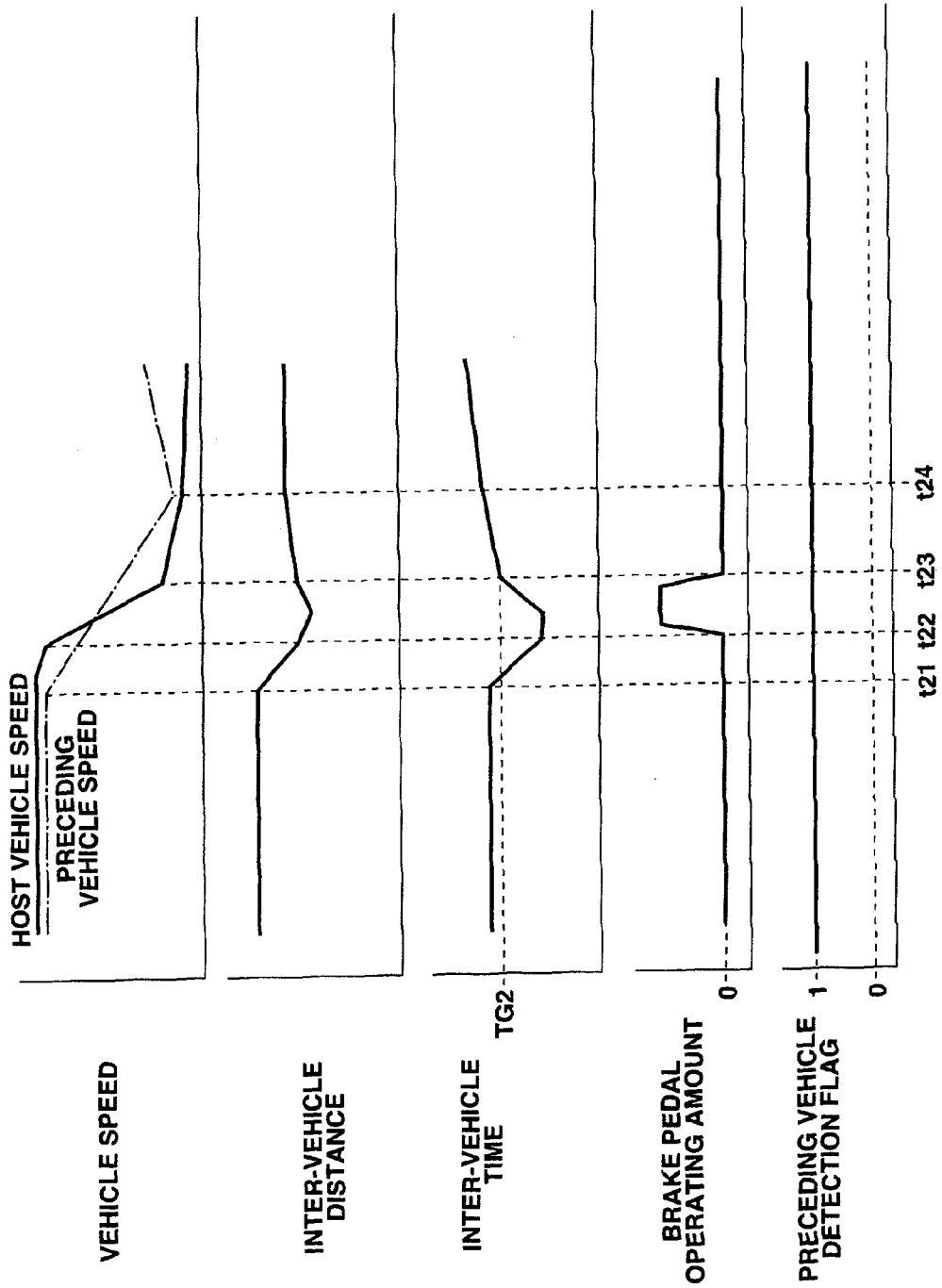
FIG. 4 is a time chart showing a follow-up running control according to the first embodiment of the present invention.

FIG. 4 is a time chart showing the follow-up running control according to the first embodiment. This corresponds to an operation in which the process proceeds by step S202→S208→S209→S210 and S211 of FIG. 2. An initial state is a state in which the follow-up running control is performed so that the inter-vehicle time becomes TG2 when the preceding vehicle runs at the predetermined constant speed.

At time t21, when the preceding vehicle starts to decelerate, the inter-vehicle time becomes shorter than the inter-vehicle time TG2. At time t22, when the driver depresses the brake pedal to switch the brake to the ON state, the deceleration operation is performed in accordance with the brake operating amount. With this, the vehicle speed of the host vehicle becomes smaller than the vehicle speed of the preceding vehicle. In this state, when the driver brings the brake pedal to the OFF state, the preceding vehicle follow-up running control is performed. However, even when the preceding vehicle is accelerated at time t24, the only deceleration control is permitted in this case. Accordingly, the driver does not feel unnatural feeling to accelerate irrespective of the driver's intension of the deceleration.

Figure 5:
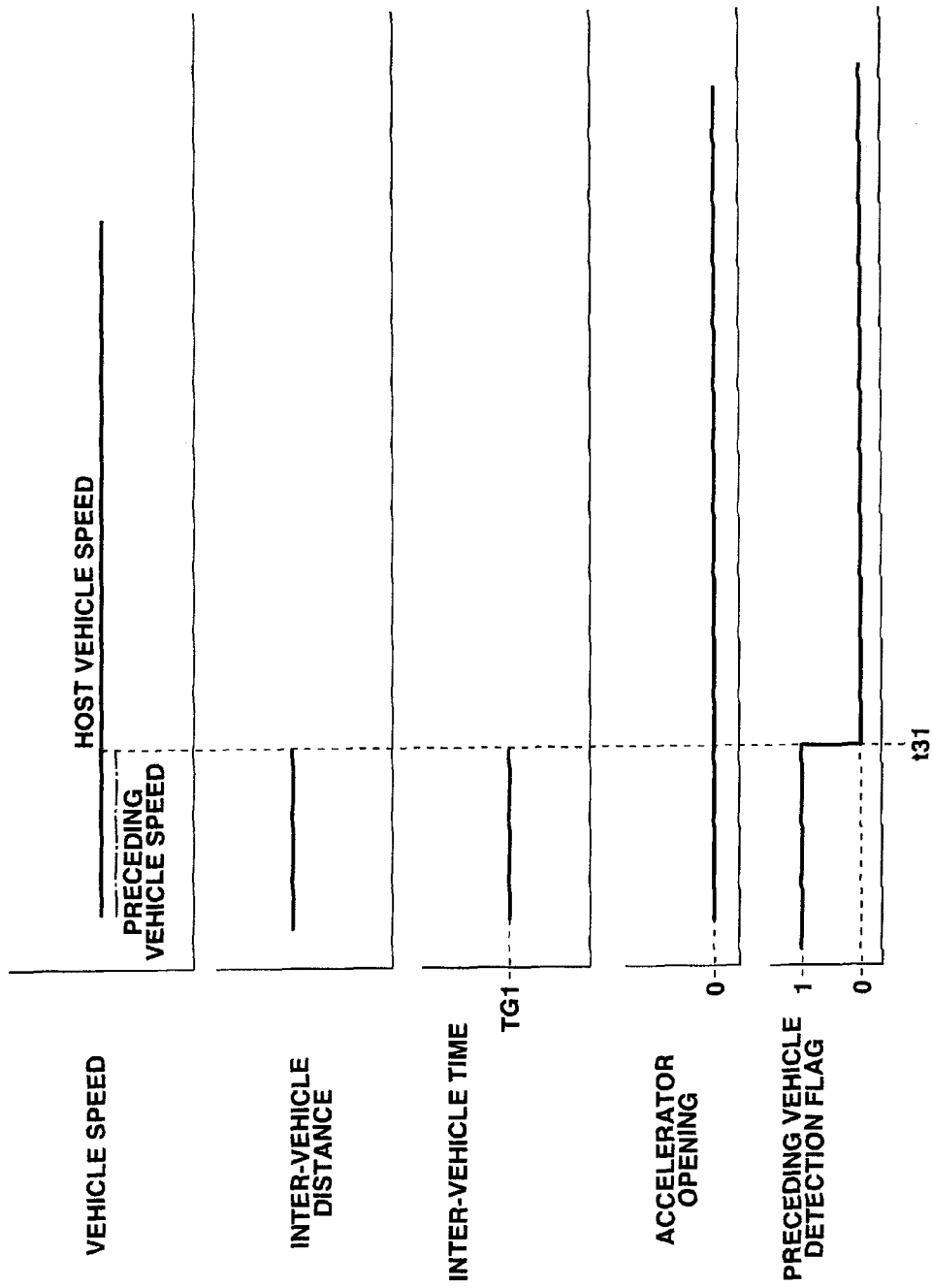
FIG. 5 is a time chart showing a follow-up running control according to the first embodiment of the present invention.

FIG. 5 is a time chart showing the follow-up running control according to the first embodiment. This corresponds to an operation in which the process proceeds by step S202→S203→S205→S206 of FIG. 3. An initial state is a state in which the preceding vehicle follow-up control is performed in a state in which the accelerator pedal is in the OFF state. At time t31, when the preceding vehicle is lost, the vehicle speed at the lost is set to the set vehicle speed, and the constant speed running control is performed. With this, the driver does not need to set, again, the vehicle speed and so on to perform the constant speed running control. Accordingly, the vehicle running control with no unnatural feeling is attained.

Figure 6:
FIG. 6 is a time chart showing a constant speed running control according to the first embodiment of the present invention.

FIG. 6 is a time chart showing the constant speed running control according to the first embodiment. This corresponds to an operation in which the process proceeds by step S202→S203→S205→S206 of FIG. 2. An initial state is a state in which the driver depresses the accelerator to accelerate when there is no preceding vehicle. At time t41, when the driver switches the accelerator to the OFF state, the vehicle speed at this time is set to the set vehicle speed, and the constant speed running control is performed.

As mentioned above, the control apparatus according to the first embodiment makes it possible to attain effects described below.

(1). (1) A vehicle control system includes: an inter-vehicle distance control section configured to perform a follow-up control to a preceding vehicle by automatically accelerating or decelerating a host vehicle, or a constant speed running control section configured to perform a constant speed running to converge to a set speed; a brake operating state sensing device (master cylinder hydraulic pressure sensor 104) arranged to sense a brake operating state of a driver; and a control unit (brake ECU 102) including; a deceleration control section configured to perform a deceleration in accordance with the brake operating state of the driver when the brake operating state sensing device (104) senses the brake operation of the driver during the inter-vehicle distance control or the constant speed running control; and an acceleration control limit section (step S210) configured to cancel a control in the acceleration direction which is performed by the inter-vehicle distance control or the constant speed control when the brake operating state sensing device (104) senses an end of the brake operation of the driver.

Accordingly, it is possible to suppress the unnecessary acceleration after the operation of the brake pedal by the driver when the inter-vehicle distance control or the constant speed running control is performed.

(2). (2) The vehicle control system further comprises an accelerator operating state sensing device (accelerator opening sensor 110) arranged to sense an accelerator operating state of the driver; and the control unit (brake ECU 102) is configured to perform the inter-vehicle distance control or the constant speed running control when the accelerator operating state sensing device senses a decreasing direction of an accelerator operating amount.

Accordingly, it is possible to readily start the inter-vehicle distance control or the constant speed running control without the special operation of the setting of the control operation by the driver.

(3). (3) The vehicle control system further comprises an inter-vehicle distance control start switch (vehicle control permission switch 106) configured to hold a state in which the inter-vehicle distance control is performed, and a preceding vehicle sensing device (camera 107) arranged to sense the preceding vehicle; and the control unit (brake ECU 102) is configured to perform the constant speed running control (S206) when the vehicle speed is equal to or greater than a predetermined speed (S205:YES) when the preceding vehicle sensing device (107) does not sense the preceding vehicle during the inter-vehicle distance control, and the accelerator operating state sensing device senses the decreasing direction of the accelerator operation amount, and to perform a coast running (S207) when the vehicle speed is smaller than the predetermined speed (S205:NO), when the preceding vehicle sensing device (107) does not sense the preceding vehicle during the inter-vehicle distance control, and the accelerator operating state sensing device senses the decreasing direction of the accelerator operation amount.

When the vehicle speed is smaller than the predetermined vehicle speed, it is considered that the driver has a stop intension. At this time, the coast running and so on is performed when the vehicle speed is smaller than the predetermined speed. With this, it is possible to remove the unnatural feeling to the driver.

(4). (5) The control unit (brake ECU 102) is configured to perform the inter-vehicle distance control by setting, to a set inter-vehicle distance, an inter-vehicle distance when the accelerator operating state sensing device (accelerator opening sensor 110) senses the decreasing direction of the accelerator operating amount, and a speed of the host vehicle becomes substantially equal to a speed of the preceding vehicle.

Accordingly, it is possible to smoothly switch to the inter-vehicle distance control.

(5). (6) The vehicle control system further comprises a preceding vehicle sensing device (107) arranged to sense the preceding vehicle; and the control unit (brake ECU 102) is configured to operate the acceleration limit control section (S210) when the preceding vehicle sensing device senses the preceding vehicle (S209:YES), and to stop the inter-vehicle distance control and the constant speed running control and to perform the coast running (step S207) when the preceding vehicle sensing device does not sense the preceding vehicle (S209:NO).

After the driver releases the brake pedal 103, it is considered that the driver wishes the running other than the acceleration running, that is, the deceleration running or the coast running. By performing the control operation in accordance with that driver's intension, it is possible to suppress the unnatural feeling to the driver.

(6). (7) The coast running has a deceleration degree substantially identical to a deceleration degree of an engine braking of the host vehicle.

Accordingly, the vehicle is in the running state identical to the running state attained in the normal vehicle. Therefore, it is possible to suppress the unnatural feeling to the driver.

Moreover, the control apparatus according to the first embodiment as described below makes it possible to attain effects described below.

(7). (8) A vehicle control system includes: a preceding vehicle sensing device (camera 107) arranged to sense a preceding vehicle; an inter-vehicle distance control section configured to perform a follow-up control to the preceding vehicle by automatically accelerating or decelerating a host vehicle; a brake operating state sensing device (master cylinder hydraulic pressure sensor 104) arranged to sense a brake operating state of a driver; and a control unit (brake ECU 102) configured to perform a deceleration control in accordance with the brake operation state of the driver when the brake operating state sensing device (104) senses the brake operation of the driver during the inter-vehicle distance control, to perform a coast running (S209→S207) when the brake operating state sensing device (104) senses an end of the brake operation, and the preceding vehicle sensing device (107) does not sense the preceding vehicle, and to perform an acceleration limit inter-vehicle distance control (S209→S210) to cancel a control in the acceleration direction which is performed by the inter-vehicle distance control when the brake operating state sensing device senses the end of the brake operation, and the preceding vehicle sensing device (107) senses the preceding vehicle.

Accordingly, it is possible to suppress the unnecessary acceleration after the operation of the brake pedal by the driver when the inter-vehicle distance control is performed, and to suppress the unnatural feeling to the driver by performing the control operation in accordance with the driver's intension.

(8). (9) The coast running has a deceleration degree substantially identical to a deceleration degree of an engine braking of the host vehicle.

Accordingly, it is possible to suppress the unnatural feeling to the driver by performing the control operation in accordance with the driver's intension.

(9). (10) The vehicle control system further comprises an accelerator operating state sensing device (accelerator opening sensor 110) arranged to sense an accelerator operating state of the driver; and the control unit (brake ECU 102) is configured to perform the inter-vehicle distance control when the accelerator operating state sensing device (accelerator opening sensor 110) senses a decreasing direction of an accelerator operating amount.

Accordingly, it is possible to smoothly interpose to the inter-vehicle distance control.

(10). (11) The vehicle control system further comprises an inter-vehicle distance control start switch (vehicle control permission switch 106) configured to hold a state in which the inter-vehicle distance control is performed, and a constant speed running control section configured to perform a constant speed running to converge to a set speed; and the control unit (brake ECU 102) is configured to perform the constant speed running control when the vehicle speed is equal to or greater than a predetermined speed, when the preceding vehicle sensing device (camera 107) does not sense the preceding vehicle during the inter-vehicle distance control, and the accelerator operating state sensing device senses the decreasing direction of the accelerator operation amount, and to perform the deceleration control when the vehicle speed is smaller than the predetermined speed, when the preceding vehicle sensing device (107) does not sense the preceding vehicle during the inter-vehicle distance control, and the accelerator operating state sensing device (accelerator opening device 110) senses the decreasing direction of the accelerator operation amount.

When the vehicle speed is smaller than the predetermined vehicle speed, it is considered that the driver has a stop intension. Accordingly, it is possible to remove the unnatural feeling to the driver by performing the deceleration control when the vehicle speed is smaller than the predetermined speed.

(11). (13) The control unit (brake ECU 102) is configured to perform the inter-vehicle distance control by setting, to a set inter-vehicle distance, an inter-vehicle distance when the accelerator operating state sensing device (accelerator opening sensor 110) senses the decreasing direction of the accelerator operating amount, and a speed of the host vehicle becomes substantially equal to a speed of the preceding vehicle.

Accordingly, it is possible to smoothly switch to the inter-vehicle distance control.

(12). (14) A vehicle control system includes: an accelerator operating state sensing device (accelerator opening sensor 110) arranged to sense an accelerator operating state of a driver; a brake operating state sensing device (master cylinder hydraulic pressure sensor 104) arranged to sense a brake operating state of the driver; an inter-vehicle distance control section configured to perform an inter-vehicle distance control to start a follow-up control to hold a predetermined inter-vehicle distance between a host vehicle and a preceding vehicle when the accelerator operating state sensing section senses a decreasing direction of an accelerator operating amount; a deceleration section configured to perform a deceleration control in accordance with the brake operating state of the driver when the brake operating state sensing device (104) senses the brake operation; and an acceleration control limit section configured to cancel a control in the acceleration direction which is performed by the inter-vehicle distance control when the brake operating state sensing section (104) senses an end of the brake operation.

Accordingly, it is possible to suppress the unnecessary acceleration after the driver's brake pedal operation when the inter-vehicle distance control is performed.

(13). (15) The control unit (brake ECU 102) is configured to perform the inter-vehicle distance control by setting, to a set inter-vehicle distance, an inter-vehicle distance when the accelerator operating state sensing device (accelerator opening sensor 110) senses the decreasing direction of the accelerator operating amount, and the host vehicle speed becomes substantially equal to the preceding vehicle speed.

Accordingly, it is possible to smoothly switch to the inter-vehicle distance control (14). (16) The vehicle control system further comprises an inter-vehicle distance control start switch (vehicle control permission switch 106) configured to hold a state in which the inter-vehicle distance control is performed, and a constant speed running control section configured to perform a constant speed running to converge to a set speed; and the control unit (brake ECU 102) is configured to perform the constant speed running control when the vehicle speed is equal to or greater than a predetermined speed, when the preceding vehicle is not sensed during the inter-vehicle distance control, and the accelerator operating state sensing section (accelerator opening sensor 110) senses the decreasing direction of the accelerator operating amount, and to perform the deceleration control when the vehicle speed is smaller than the predetermined speed, when the preceding vehicle is not sensed during the inter-vehicle distance control, and the accelerator operating state sensing section (accelerator opening sensor 110) senses the decreasing direction of the accelerator operation amount.

When the vehicle speed is smaller than the predetermined vehicle speed, it is considered that the driver has a stop intension. Accordingly, it is possible to remove the unnatural feeling to the driver by performing the deceleration control when the vehicle speed is smaller than the predetermined speed.

(15). (19) The vehicle control system further comprises a preceding vehicle sensing device (camera 107) arranged to sense the preceding vehicle; and the control unit (brake ECU 102) is configured to operate the acceleration control limit section when the preceding vehicle sensing device senses the preceding vehicle, and to stop the inter-vehicle distance control and to perform the deceleration control when the preceding vehicle sensing device does not sense the preceding vehicle.

After the driver releases the brake pedal 103, it is considered that the driver wishes the running other than the acceleration running, that is, the deceleration running or the coast running. By performing the control operation in accordance with that driver's intension, it is possible to suppress the unnatural feeling to the driver.

(16). (19) The deceleration control has a deceleration degree substantially identical to a deceleration degree of the engine braking of the vehicle.

Accordingly, the vehicle is brought to the running state identical to the running state attained in the normal vehicle. Therefore, it is possible to suppress the unnatural feeling to the driver.

Figure 7:
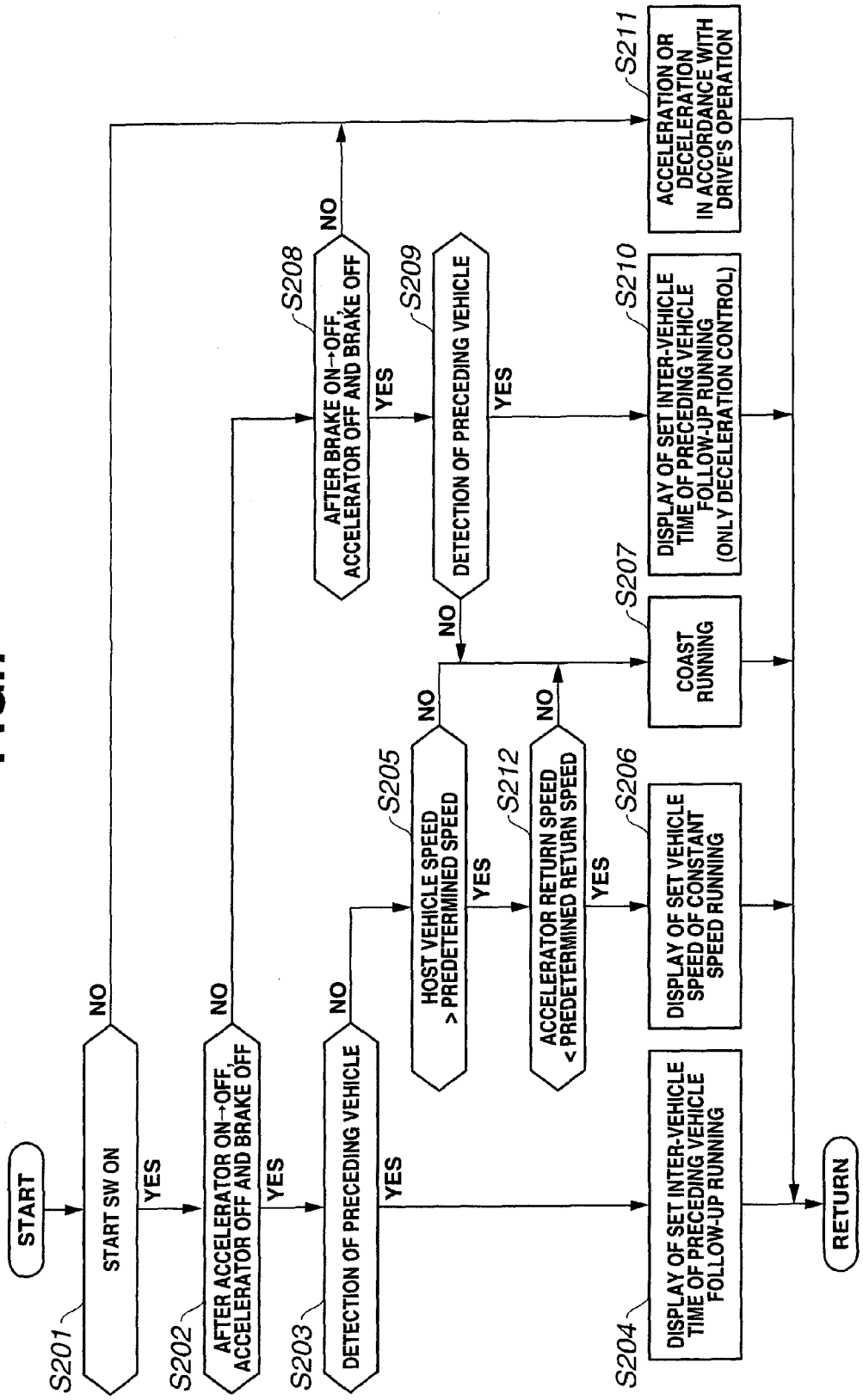
FIG. 7 is a flowchart showing a vehicle control operation performed in a vehicle control system according to a second embodiment of the present invention.

Next, a control apparatus according to a second embodiment of the present invention is illustrated. The following explanation is directed only to points different from the first embodiment, and repetitive explanation is omitted. FIG. 7 is a flowchart showing a vehicle control operation performed in the second embodiment. The basic steps are identical to those of the first embodiment. At step S205, when it is judged that the host vehicle speed is greater than a predetermined vehicle speed (for example, 40 km/h), the process proceeds to step S212, in place of step S206 in the first embodiment.

At step S212, brake ECU 102 senses an accelerator return speed when the driver returns accelerator pedal 109. When the accelerator return speed is smaller than a predetermined return speed, the process proceeds to step S206. At step S206, the vehicle performs the constant speed running control. When the accelerator return speed is equal to or greater than the predetermined return speed, the process proceeds to step S207. At step S207, the vehicle performs the coast running (the engine braking). In this case, the predetermined return speed is set to a speed when the driver rapidly returns accelerator pedal 109 for the emergency brake operation. With this, the constant speed running control is performed at the normal accelerator pedal operation. The coast running (the engine braking) is performed when the accelerator pedal 109 is rapidly returned for the emergency brake operation. The acceleration control is suppressed. Accordingly, it is possible to improve the initial rise or initial increase of the deceleration by the driver's operation, and to perform the smooth deceleration.

As mentioned above, the control apparatus according to the second embodiment makes it possible to attain effects described below.

(17). (4) The vehicle control system further comprises an inter-vehicle distance control switch (vehicle control permission switch 106) arranged to hold a state in which the inter-vehicle distance control is performed, and a preceding vehicle sensing device (camera 107) arranged to sense the preceding vehicle; the accelerator operating state sensing device (accelerator opening sensor 110) is configured to sense a return speed of the accelerator operation; and the control unit (brake ECU 102) is configured to perform the deceleration control when the sensed accelerator return speed is equal to or greater than a predetermined return speed during the constant speed running control.

With this, it is possible to improve the initial rise or the initial increase of the deceleration by the brake operation by the driver in the emergency brake operation, and to perform the smooth deceleration.

(18). (12) The vehicle control system further comprises an inter-vehicle distance control start switch (vehicle control permission switch 106) arranged to hold a state in which the inter-vehicle distance control is performed, and a preceding vehicle sensing device (camera 107) arranged to sense the preceding vehicle; the accelerator operating state sensing device (accelerator opening sensor 110) is configured to sense a return speed of the accelerator operation; and the control unit (brake ECU 102) is configured to perform the deceleration control when the sensed accelerator return speed is equal to or greater than a predetermined return speed during the constant speed running.

With this, it is possible to improve the initial rise or the initial increase of the deceleration by the brake operation by the driver in emergency brake operation, and to perform the smooth deceleration.

(19). (17) The vehicle control system further comprises an inter-vehicle distance control start switch (vehicle control permission switch 106) arranged to hold a state in which the inter-vehicle distance control is performed, and a preceding vehicle sensing device (camera 107) arranged to sense the preceding vehicle; the accelerator operating state sensing device (accelerator opening switch 110) is configured to sense a return speed of the accelerator operation;

and the control unit (brake ECU 102) is configured to perform the deceleration control when the sensed accelerator return speed is equal to or greater than a predetermined return speed during the constant speed running.

With this, it is possible to improve the initial rise or the initial increase of the deceleration by the brake operation by the driver in emergency brake operation, and to perform the smooth deceleration.

(20). (18) The deceleration control has a deceleration degree substantially identical to a deceleration degree of an engine braking of the vehicle.

Accordingly, the vehicle is brought to the running state identical to the running state attained in the normal vehicle. Therefore, it is possible to suppress the unnatural feeling to the driver.

Figure 8:
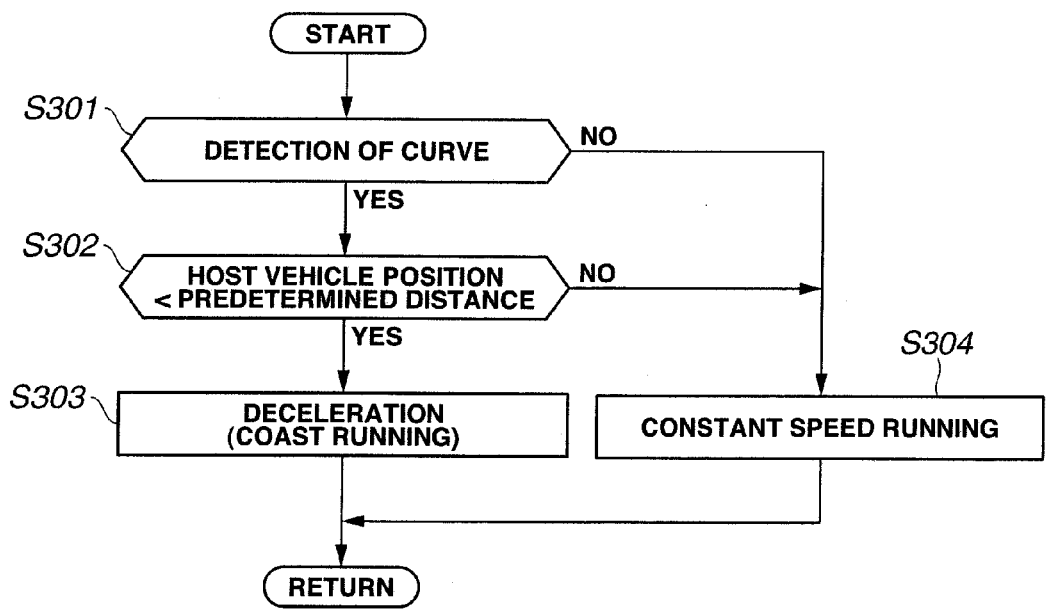
FIG. 8 is a flowchart showing a curve control operation during a constant speed running control performed in a vehicle control system according to a third embodiment of the present invention.

Next, a control apparatus according to a third embodiment of the present invention is illustrated. The following explanation is directed only to points different from the first embodiment, and repetitive explanation is omitted. FIG. 8 is a flowchart showing a curve control operation during the constant speed running control operation performed in the vehicle control system of FIG. 8 according to the third embodiment.

At step S301, camera 107 senses a state of a road forward of the host vehicle, and senses a curve. When it is judged that there is the curve, a curve detection flag is set to 1, and the process proceeds to step S302. When it is not judged that there is the curve, the curve detection flag is set to 0, and the process proceeds to step S304.

At step S302, brake ECU 102 senses a distance between the host vehicle and an entrance (start) of the curve. When the distance between the host vehicle and the entrance of the curve is equal to or smaller than a predetermined distance LC1, the process proceeds to step S303. When the distance between the host vehicle and the entrance of the curve is greater than the predetermined distance LC1, the process proceeds to step S304. At step S304, the constant speed running control is performed.

At step S303, the deceleration control or the coast running (the engine braking) is performed to decelerate the host vehicle.

Figure 9:
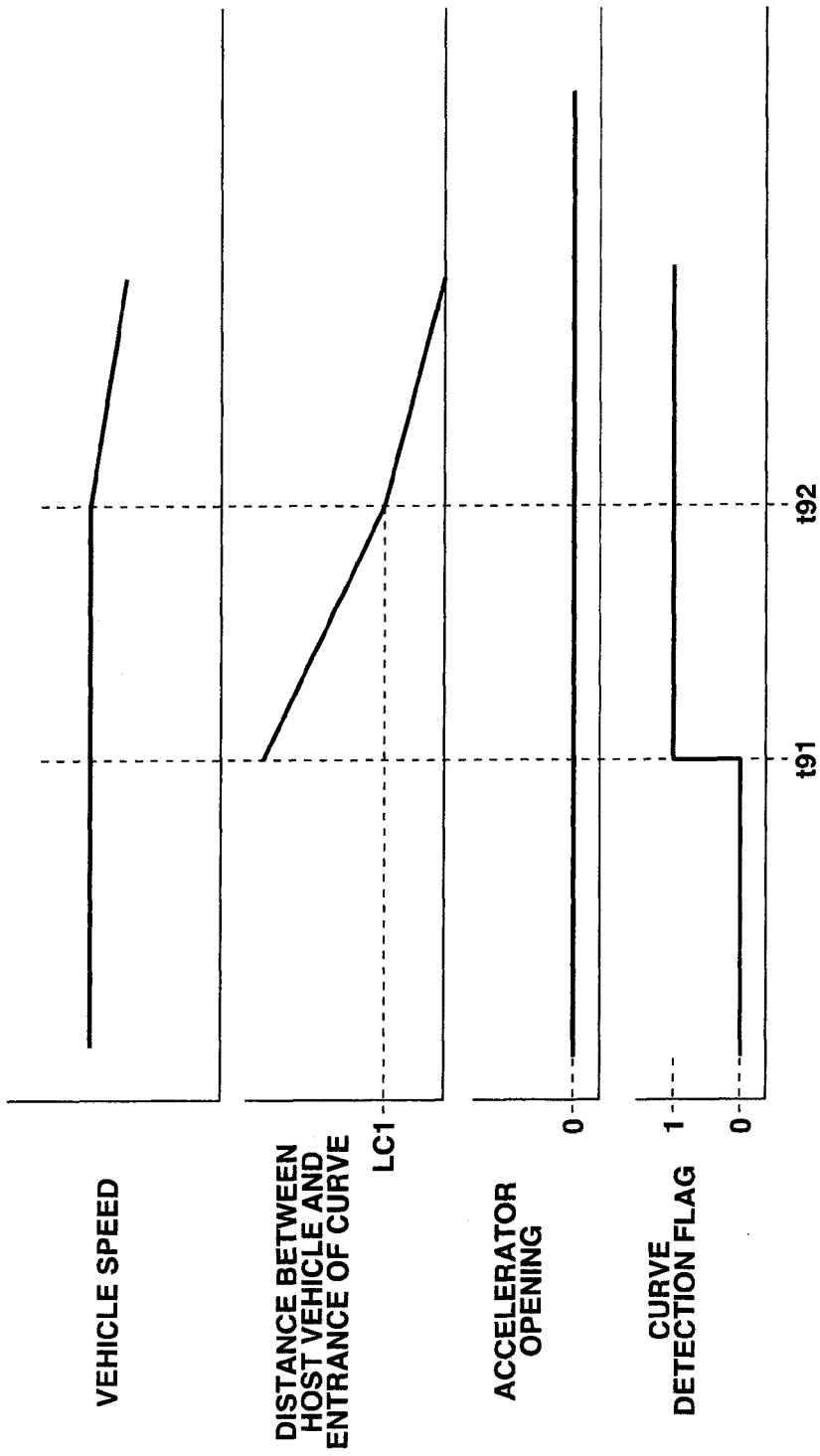
FIG. 9 is a time chart when the curve is sensed during the constant speed control of the vehicle control system according to the third embodiment.

FIG. 9 is a time chart when the curve is sensed in the constant speed running control according to the third embodiment. At time t91, when camera 107 senses the curve, the curve detection flag is set to 1. At this time, the distance between the host vehicle and the entrance of the curve is greater than the predetermined distance LC1. Accordingly, the constant speed running control is continued. At time t92, when the distance between the host vehicle and the entrance of the curve becomes the predetermined distance LC1, the deceleration control or the coast running (the engine braking) is performed. With this, the vehicle speed is decreased, and it is possible to secure the stability of the vehicle when the vehicle runs at the curve.

When the deceleration control is performed, it is optional to set the deceleration degree in accordance with the radius of curvature of the curve and so on, and to set to the state in which the engine braking is acted. Moreover, after the deceleration control, it is optional to employ a configuration in which the acceleration control is canceled even during the constant speed running control, as shown at step S210 of the first embodiment. Furthermore, it is optional to permit the acceleration control when the accelerator is again switched from the OFF state to the ON state, in addition to the configuration to cancel the only acceleration control. The above described illustration shows the example applied to the first embodiment. However, the structure of the third embodiment may be applied to the second embodiment. With this, it is also possible to attain the effect of each of the first and second embodiments.

Figure 10:
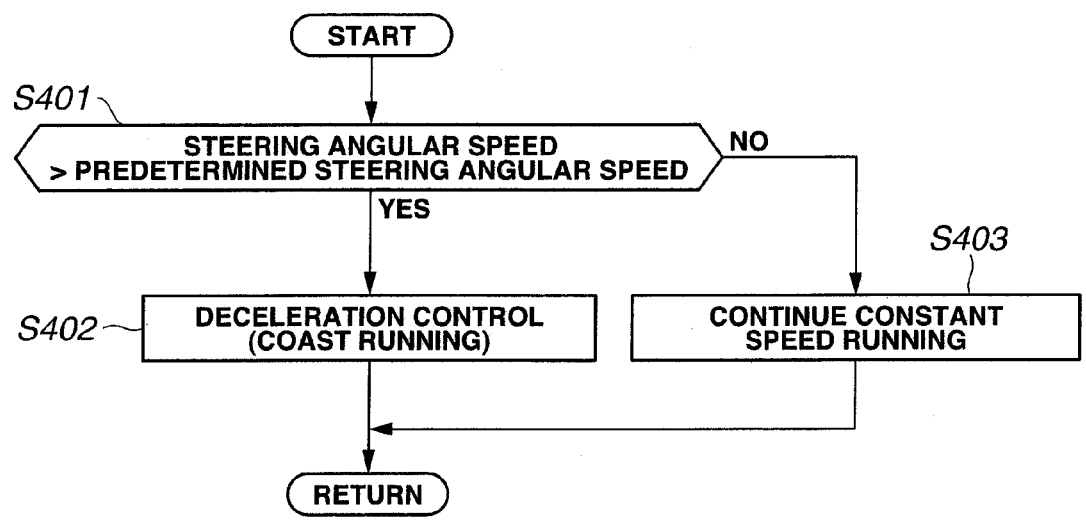
FIG. 10 is a flowchart showing a curve control operation during a constant speed running control operation performed in a vehicle control system according to a fourth embodiment of the present invention.

Next, a fourth embodiment is illustrated. The following explanation is directed only to points different from the first embodiment, and repetitive explanation is omitted. The vehicle control system according to the fourth embodiment includes a steering angle sensor 112 arranged to sense the steering angle which is a steering operating amount of the driver, in addition to the sensors of the first embodiment (cf. FIG. 1). This steering angle sensor 112 is arranged to sense the steering angle and also the steering angular speed, and to output this sensed steering angular speed to brake ECU 102. FIG. 10 is a flowchart showing a curve control operation during the constant speed running control performed in the vehicle control system according to the fourth embodiment.

At step S401, brake ECU 102 judges whether or not the steering angular speed is greater than a predetermined angular speed. When the answer of step S401 is affirmative (YES), the process proceeds to step S402. At step S402, the deceleration control or the coast running (the engine braking) control is performed to decelerate the host vehicle. That is, when the steering angular speed is high, it is estimated (presumed) that the variation of the yaw rate and so on generated in the vehicle becomes large. In this case, the variation of the yaw rate and so on is suppressed by decreasing the vehicle speed, so that the stability of the vehicle is secured. After the deceleration control, the acceleration control is canceled even during the constant speed running control, as shown at step S210 of the first embodiment. In addition to the structure to cancel the acceleration control, the control operation is returned to the constant speed running control to permit the acceleration control when the accelerator is again switched from the OFF state to the ON state. When the deceleration control is performed, it is optional to set the deceleration degree in accordance with the steering angular speed and so on, and to set to the state in which the engine braking is acted.

On the other hand, when the answer of step S401 is negative (NO) (it is judged that the steering angular speed is equal to or smaller than the predetermined angular speed), the process proceeds to step S403, and the constant speed running control is continued. In particular, when the variation of the yaw rate and so on is small, the unnatural feeling to the driver is suppressed by continuing the constant speed running control.

FIG. 11 is a time chart when the vehicle performs the rapid lane change to avoid the obstruction during the constant speed running control according to the fourth embodiment. The driver rapidly starts the lane change to avoid the obstruction during the constant speed running control, and steers the steering wheel in a clockwise direction. At time 101, the steering angular speed exceeds (becomes greater than) the predetermined angular speed SS1, and accordingly the deceleration control or the coast running control is performed. Then, even when the steering angular speed becomes smaller than the predetermined angular speed SS1, the deceleration control or the coast running control is continued. With this, it is possible to stabilize the vehicle behavior (movement), and to suppress the unnatural feeling to the driver. Moreover, the above-described illustration shows the example applied to the first embodiment. However, the structure of the fourth embodiment may be applied to the structure of the second or third embodiment. When the structure of the fourth embodiment is applied to the structure of the third embodiment, for example, the coast running may be performed in front of the curve. After the vehicle enters the curve, it is optional to add the deceleration degree in accordance with the steering angular speed of the driver when the vehicle passes the curve. With this, it is possible to attain the effect of each embodiment.

Although the invention has been described above by reference to the embodiments of the invention, the invention is not limited to the embodiments described above. For example, in the embodiments, the vehicle control system starts the inter-vehicle distance control or the constant speed running control in response to the operation of the accelerator pedal and the operation of the brake pedal. The present invention is applicable to a control system in which the inter-vehicle distance and/or the vehicle speed is set by the manual operation of the driver.

In the embodiments, master cylinder hydraulic pressure sensor 104 is employed as the brake operating state sensing device. However, it is optional to use a brake pedal stroke sensor arranged to sense a stroke of the brake pedal, and a brake pedal force sensor arranged to sense a brake pedal force, a brake switch arranged to serve as a trigger for lighting brake lumps when the brake pedal is depressed by a predetermined amount, or so on.

In the embodiments, accelerator opening sensor 110 is employed as the accelerator operating state sensing device. However, it is optional to use a throttle opening sensor arranged to sense a throttle opening of the engine and so on.

In the embodiments, vehicle control permission switch 106 is employed as the inter-vehicle distance control start switch. However, it is optional to independently provide a switch for starting the inter-vehicle distance control, and a switch for starting the constant speed running control. Moreover, it is optional to provide a switch for starting the overall vehicle control including the inter-vehicle distance control and the constant speed running control. The switch is not limited to the manual operation. It is optional to use a voice-recognition system or speech-recognition system, and to automatically start in accordance with running conditions and so on.

In the embodiments, camera 107 is employed as the preceding vehicle sensing device. It is optional to employ a device such as a stereo camera arranged to sense the distance and the speed. Moreover, it is optional to employ a submillimeter radar or laser radar, and to combine a monocular camera and a radar and so on.

In the embodiments, the present invention is applied to the vehicle equipped with the engine. However, the present invention is applicable to a hybrid vehicle which runs by an engine and a motor, and an electric vehicle which runs only by a motor. In this case, when the coast running is performed, the motor and so on can attain the deceleration degree identical to the deceleration degree generated by the engine braking.

The embodiments show the structure which has the inter-vehicle distance control and the constant speed running control. However, the present invention is applicable to the structure which has one of the inter-vehicle distance control and the constant speed running control.

For attaining the object of the present invention, the vehicle control system according to the embodiments of the present invention is arranged to cancel the acceleration control when the driver operates the brake operation while the inter-vehicle distance control or the constant speed running control is performed.

Accordingly, it is possible to suppress the unnecessary acceleration after the driver's brake operation during the control operation, and to attain the running state in accordance with the driver's intension.

The entire contents of Japanese Patent Application No. 2009-215570 filed Sep. 17, 2009 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A vehicle control system comprising:
an inter-vehicle distance control section configured to perform a follow-up control to a preceding vehicle by automatically accelerating or decelerating a host vehicle, or a constant speed running control section configured to perform a constant speed running to converge to a set speed;
a brake operating state sensing device arranged to sense a brake operating state of a driver; and
a control unit including;
a deceleration control section configured to perform a deceleration in accordance with the brake operating state of the driver when the brake operating state sensing device senses the brake operation of the driver during the inter-vehicle distance control or the constant speed running control; and
an acceleration control limit section configured to cancel a control in the acceleration direction which is performed by the inter-vehicle distance control or the constant speed control when the brake operating state sensing device senses an end of the brake operation of the driver.

2. The vehicle control system as claimed in claim 1, wherein the vehicle control system further comprises an accelerator operating state sensing device arranged to sense an accelerator operating state of the driver; and the control unit is configured to perform the inter-vehicle distance control or the constant speed running control when the accelerator operating state sensing device senses a decreasing direction of an accelerator operating amount.

3. The vehicle control system as claimed in claim 2, wherein the vehicle control system further comprises an inter-vehicle distance control start switch configured to hold a state in which the inter-vehicle distance control is performed, and a preceding vehicle sensing device arranged to sense the preceding vehicle; and the control unit is configured to perform the constant speed running control when the vehicle speed is equal to or greater than a predetermined speed when the preceding vehicle sensing device does not sense the preceding vehicle during the inter-vehicle distance control, and the accelerator operating state sensing device senses the decreasing direction of the accelerator operation amount, and to perform a coast running when the vehicle speed is smaller than the predetermined speed, when the preceding vehicle sensing device does not sense the preceding vehicle during the inter-vehicle distance control, and the accelerator operating state sensing device senses the decreasing direction of the accelerator operation amount.

4. The vehicle control system as claimed in claim 2, wherein the vehicle control system further comprises an inter-vehicle distance control switch arranged to hold a state in which the inter-vehicle distance control is performed, and a preceding vehicle sensing device arranged to sense the preceding vehicle; the accelerator operating state sensing device is configured to sense a return speed of the accelerator operation; and the control unit is configured to perform the deceleration control when the sensed accelerator return speed is equal to or greater than a predetermined return speed during the constant speed running control.

5. The vehicle control system as claimed in claim 2, wherein the control unit is configured to perform the inter-vehicle distance control by setting, to a set inter-vehicle distance, an inter-vehicle distance when the accelerator operating state sensing device senses the decreasing direction of the accelerator operating amount, and a speed of the host vehicle becomes substantially equal to a speed of the preceding vehicle.

6. The vehicle control system as claimed in claim 1, wherein the vehicle control system further comprises a preceding vehicle sensing device arranged to sense the preceding vehicle; and the control unit is configured to operate the acceleration limit control section when the preceding vehicle sensing device senses the preceding vehicle, and to stop the inter-vehicle distance control and the constant speed running control and to perform the coast running when the preceding vehicle sensing device does not sense the preceding vehicle.

7. The vehicle control system as claimed in claim 6, wherein the coast running has a deceleration degree substantially identical to a deceleration degree of an engine braking of the host vehicle.

8. A vehicle control system comprising:
a preceding vehicle sensing device arranged to sense a preceding vehicle;
an inter-vehicle distance control section configured to perform a follow-up control to the preceding vehicle by automatically accelerating or decelerating a host vehicle;
a brake operating state sensing device arranged to sense a brake operating state of a driver; and
a control unit configured
to perform a deceleration control in accordance with the brake operation state of the driver when the brake operating state sensing device senses the brake operation of the driver during the inter-vehicle distance control,
to perform a coast running when the brake operating state sensing device senses an end of the brake operation, and the preceding vehicle sensing device does not sense the preceding vehicle, and
to perform an acceleration limit inter-vehicle distance control to cancel a control in the acceleration direction which is performed by the inter-vehicle distance control when the brake operating state sensing device senses the end of the brake operation, and the preceding vehicle sensing device senses the preceding vehicle.

9. The vehicle control system as claimed in claim 8, wherein the coast running has a deceleration degree substantially identical to a deceleration degree of an engine braking of the host vehicle.

10. The vehicle control system as claimed in claim 8, wherein the vehicle control system further comprises an accelerator operating state sensing device arranged to sense an accelerator operating state of the driver; and the control unit is configured to perform the inter-vehicle distance control when the accelerator operating state sensing device senses a decreasing direction of an accelerator operating amount.

11. The vehicle control system as claimed in claim 10, wherein the vehicle control system further comprises an inter-vehicle distance control start switch configured to hold a state in which the inter-vehicle distance control is performed, and a constant speed running control section configured to perform a constant speed running to converge to a set speed; and the control unit is configured to perform the constant speed running control when the vehicle speed is equal to or greater than a predetermined speed, when the preceding vehicle sensing device does not sense the preceding vehicle during the inter-vehicle distance control, and the accelerator operating state sensing device senses the decreasing direction of the accelerator operation amount, and to perform the deceleration control when the vehicle speed is smaller than the predetermined speed, when the preceding vehicle sensing device does not sense the preceding vehicle during the inter-vehicle distance control, and the accelerator operating state sensing device senses the decreasing direction of the accelerator operation amount.

12. The vehicle control system as claimed in claim 10, wherein the vehicle control system further comprises an inter-vehicle distance control start switch arranged to hold a state in which the inter-vehicle distance control is performed, and a preceding vehicle sensing device arranged to sense the preceding vehicle; the accelerator operating state sensing device is configured to sense a return speed of the accelerator operation; and the control unit is configured to perform the deceleration control when the sensed accelerator return speed is equal to or greater than a predetermined return speed during the constant speed running.

13. The vehicle control system as claimed in claim 10, wherein the control unit is configured to perform the inter-vehicle distance control by setting, to a set inter-vehicle distance, an inter-vehicle distance when the accelerator operating state sensing device senses the decreasing direction of the accelerator operating amount, and a speed of the host vehicle becomes substantially equal to a speed of the preceding vehicle.

14. A vehicle control system comprising:
an accelerator operating state sensing device arranged to sense an accelerator operating state of a driver;
a brake operating state sensing device arranged to sense a brake operating state of the driver;
an inter-vehicle distance control section configured to perform an inter-vehicle distance control to start a follow-up control to hold a predetermined inter-vehicle distance between a host vehicle and a preceding vehicle when the accelerator operating state sensing section senses a decreasing direction of an accelerator operating amount;
a deceleration section configured to perform a deceleration control in accordance with the brake operating state of the driver when the brake operating state sensing device senses the brake operation; and
an acceleration control limit section configured to cancel a control in the acceleration direction which is performed by the inter-vehicle distance control when the brake operating state sensing section senses an end of the brake operation.

15. The vehicle control system as claimed in claim 14, wherein the control unit is configured to perform the inter-vehicle distance control by setting, to a set inter-vehicle distance, an inter-vehicle distance when the accelerator operating state sensing device senses the decreasing direction of the accelerator operating amount, and the host vehicle speed becomes substantially equal to the preceding vehicle speed.

16. The vehicle control system as claimed in claim 15, wherein the vehicle control system further comprises an inter-vehicle distance control start switch configured to hold a state in which the inter-vehicle distance control is performed, and a constant speed running control section configured to perform a constant speed running to converge to a set speed; and the control unit is configured to perform the constant speed running control when the vehicle speed is equal to or greater than a predetermined speed, when the preceding vehicle is not sensed during the inter-vehicle distance control, and the accelerator operating state sensing section senses the decreasing direction of the accelerator operating amount, and to perform the deceleration control when the vehicle speed is smaller than the predetermined speed, when the preceding vehicle is not sensed during the inter-vehicle distance control, and the accelerator operating state sensing section senses the decreasing direction of the accelerator operation amount.

17. The vehicle control system as claimed in claim 16, wherein the vehicle control system further comprises an inter-vehicle distance control start switch arranged to hold a state in which the inter-vehicle distance control is performed, and a preceding vehicle sensing device arranged to sense the preceding vehicle; the accelerator operating state sensing device is configured to sense a return speed of the accelerator operation; and the control unit is configured to perform the deceleration control when the sensed accelerator return speed is equal to or greater than a predetermined return speed during the constant speed running.

18. The vehicle control system as claimed in claim 17, wherein the deceleration control has a deceleration degree substantially identical to a deceleration degree of an engine braking of the vehicle.

19. The vehicle control system as claimed in claim 14, wherein the vehicle control system further comprises a preceding vehicle sensing device arranged to sense the preceding vehicle; and the control unit is configured to operate the acceleration control limit section when the preceding vehicle sensing device senses the preceding vehicle, and to stop the inter-vehicle distance control and to perform the deceleration control when the preceding vehicle sensing device does not sense the preceding vehicle.

20. The vehicle control system as claimed in claim 19, wherein the deceleration control has a deceleration degree substantially identical to a deceleration degree of the engine braking of the vehicle.

* * * * *